United States Patent
Brind'Amour et al.

(10) Patent No.: US 8,668,607 B2
(45) Date of Patent: Mar. 11, 2014

(54) DRIVING PULLEY OF A CONTINUOUSLY VARIABLE TRANSMISSION

(75) Inventors: Francois Brind'Amour, Drummondville (CA); Hubert Roberge, Drummondville (CA); Lionel Thiebault, Drummondville (CA)

(73) Assignee: Cvtech Inc., Drummondville, Quebec (CA)

(*) Notice: Subject to any disclaimer, the term of this patent is extended or adjusted under 35 U.S.C. 154(b) by 281 days.

(21) Appl. No.: 13/127,143

(22) PCT Filed: Nov. 2, 2009

(86) PCT No.: PCT/CA2009/001544
§ 371 (c)(1),
(2), (4) Date: May 2, 2011

(87) PCT Pub. No.: WO2010/060184
PCT Pub. Date: Jun. 3, 2010

(65) Prior Publication Data
US 2011/0207566 A1    Aug. 25, 2011

Related U.S. Application Data

(60) Provisional application No. 61/110,697, filed on Nov. 3, 2008.

(51) Int. Cl.
*F16H 55/56* (2006.01)

(52) U.S. Cl.
USPC ............................................................ 474/46

(58) Field of Classification Search
USPC ............................................................ 474/46
See application file for complete search history.

(56) References Cited

U.S. PATENT DOCUMENTS

| | | | |
|---|---|---|---|
| 2,612,054 A * | 9/1952 | Davis | 474/14 |
| 4,095,479 A * | 6/1978 | Lundberg | 474/12 |
| 4,458,318 A | 7/1984 | Smit et al. | |
| 4,725,259 A | 2/1988 | Miyata | |
| 5,121,936 A * | 6/1992 | Cowan | 280/236 |
| 5,234,089 A | 8/1993 | Itomi et al. | |
| 5,676,225 A | 10/1997 | Miyata | |
| 5,692,982 A * | 12/1997 | Peterson | 474/10 |
| 5,795,255 A * | 8/1998 | Hooper | 474/14 |
| 5,967,286 A * | 10/1999 | Hokanson et al. | 192/110 R |
| 6,083,130 A | 7/2000 | Mevissen et al. | |
| 6,149,540 A * | 11/2000 | Johnson et al. | 474/14 |
| 6,309,317 B1 * | 10/2001 | Joss | 474/13 |
| 6,394,248 B1 | 5/2002 | Monahan et al. | |

(Continued)

*Primary Examiner* — William A Rivera
*Assistant Examiner* — Michael Riegelman
(74) *Attorney, Agent, or Firm* — IPAXIO S.E.N.C.

(57) ABSTRACT

The driving pulley has a fully clutched mode of operation where a drivebelt and a driveshaft are coupled together in a torque transmitting engagement and also has an unclutched mode of operation where there is substantially no torque transmitting engagement between the drive belt and the driveshaft. The driving pulley comprises at least one transitional clutch spring that is in a first position when the driving pulley is in the unclutched mode of operation and that is in a second position when the driving pulley is in the fully clutched mode of operation. The at least one transitional clutch spring remains substantially in its second position regardless of the relative axial distance between the sheaves when the driving pulley is in the fully clutched mode of operation. A method of operating a driving pulley is also disclosed. The proposed concept provides a smoother engagement during the transition from the unclutched mode to the fully clutched mode.

16 Claims, 14 Drawing Sheets

(56) References Cited

U.S. PATENT DOCUMENTS

| | | |
|---|---|---|
| 6,811,504 B2 * | 11/2004 | Korenjak et al. ............... 474/14 |
| 6,953,400 B2 * | 10/2005 | Kalies ............................ 472/10 |
| 7,237,638 B2 | 7/2007 | Ishikawa et al. |
| 7,338,398 B2 * | 3/2008 | Whiting et al. ................ 474/46 |
| 7,427,248 B2 * | 9/2008 | Chonan .......................... 474/93 |
| 2003/0098216 A1 | 5/2003 | Hayashi |
| 2007/0066426 A1 | 3/2007 | Kamdem et al. |

\* cited by examiner

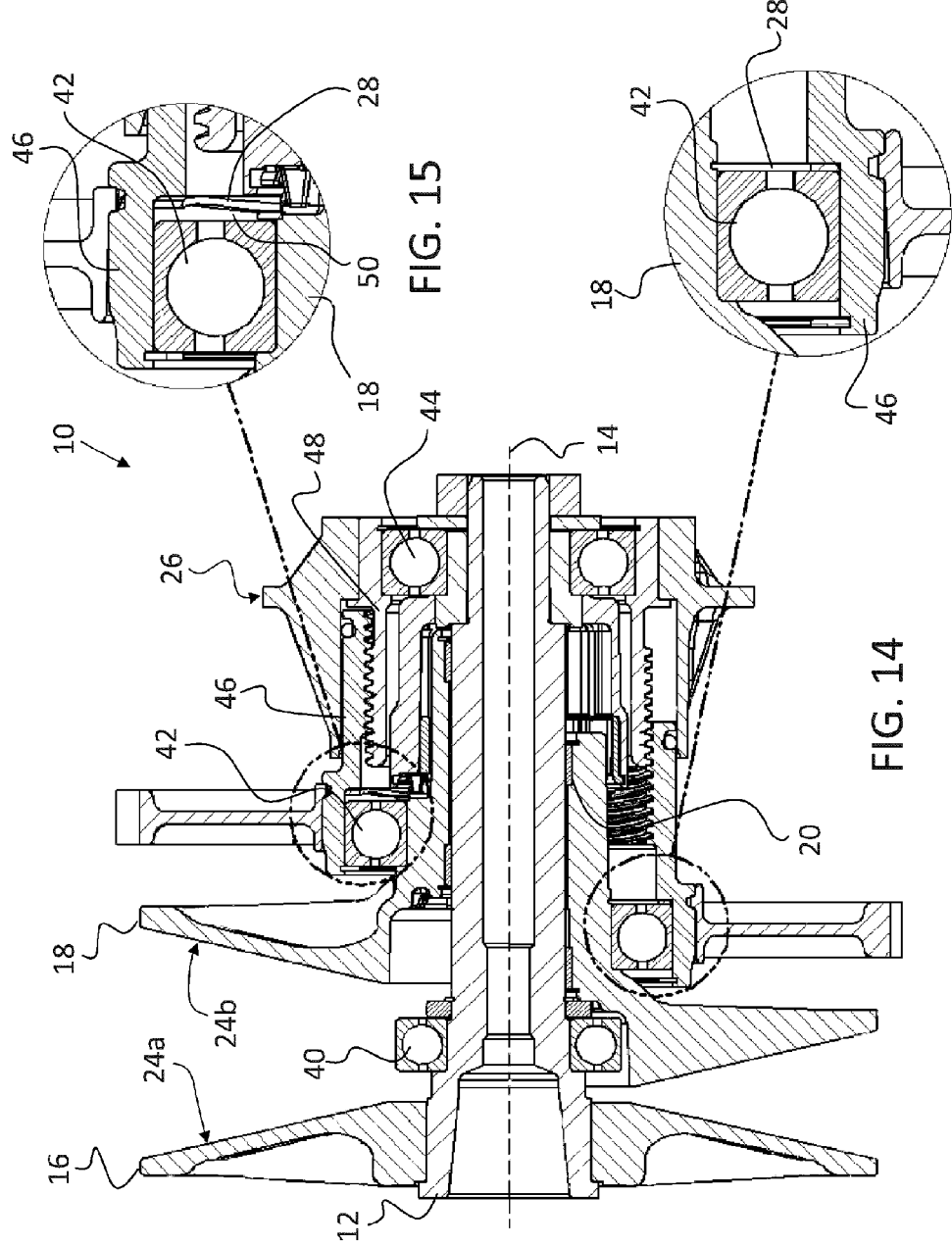

DRIVING PULLEY OF A CONTINUOUSLY VARIABLE TRANSMISSION

CROSS-REFERENCE TO RELATED APPLICATIONS

This application is a national stage filing under Section 371 of International Patent Application No. PCT/CA2009/001544, filed on 2 Nov. 2009 and published in English as WO 2010/060184 A1 on 3 Jun. 2010. PCT/CA2009/001544 claims priority to U.S. Provisional Patent Application Ser. No. 61/110,697 filed on 3 Nov. 2008. The entire contents of PCT/CA2009/001544 and of U.S. Provisional Patent Application No. 61/110,697 are incorporated herein by reference in their entirety.

TECHNICAL FIELD

The technical field generally relates to continuously variable transmissions, and more particularly to driving pulleys of continuously variables transmissions.

BACKGROUND

Continuously variable transmissions (CVTs) are commonly used on a wide range of vehicles, such as small cars or trucks, snowmobiles, golf carts, scooters, etc. They often comprise a driving pulley mechanically connected to a motor, a driven pulley mechanically connected to wheels or a track, possibly through another mechanical device such as a gearbox, and a trapezoidal drivebelt transmitting torque between the driving pulley and the driven pulley. A CVT changes the ratio within certain limits as required by the operating conditions to yield a desired motor rotational speed for a given driven pulley rotational speed, the latter being generally proportional to the vehicle speed. A CVT may be used with all kinds of motors, for instance internal combustion engines, electric motors, etc. CVTs can also be used with other machines that are not vehicles.

Each pulley of a CVT comprises two members having opposite conical surfaces, which members are called sheaves. One sheave, sometimes called "fixed sheave", can be rigidly connected to one end of a supporting shaft while the other sheave, sometimes called "movable sheave", can be free to slide and/or rotate with reference to the fixed sheave by means of bushings or the like. The conical surfaces of the sheaves apply an axial force on the drivebelt. Moving the sheaves axially relative to each other changes the drivebelt operating diameter, thus the ratio of the CVT.

In order to transmit the motor torque, an axial force has to be applied in the driving and the driven pulleys. These axial forces can be generated by a plurality of possible mechanisms or arrangements. In a legacy mechanical CVT, the axial force in the driving pulley is often generated using centrifugal flyweights, spring and ramps.

Generally, at a low vehicle speed, the operating diameter of the drivebelt at the driving pulley is minimal and the operating diameter at the driven pulley is maximal. This is referred to as the minimum ratio or the minimum ratio condition since there is the minimum number of rotations or fraction of rotation of the driven pulley for each full rotation of the driving pulley.

As the vehicle speed increases, so does the driven pulley rotational speed. For a given operating condition, a certain motor rotational speed is desired, thus a desired ratio can be calculated. The CVT actuation mechanism is provided to set the CVT to the appropriate ratio.

At the maximum vehicle speed, the ratio is generally maximum as there is the maximum number of rotations or fraction of rotation of the driven pulley for each full rotation of the driving pulley.

Some driving pulleys are provided with an integrated clutching function. The clutch function can be provided directly on the drivebelt or be provided by a mechanism incorporated in the driving pulley. For instance, when the driving pulley has a clutching function on the drivebelt, the opposite walls of the sheaves can be designed to be sufficiently away from one another that they are not in a torque-transmitting engagement with the sides of the drivebelt. Then, when the operating conditions are such that clutching is required, the actuation mechanism of the driving pulley moves the sheave walls closer relative to each other. The sheave walls eventually make contact with the sides of the drivebelt. At this point, an axial force is applied by the actuation mechanism on the drivebelt. The amount of torque transferred to the drivebelt is somewhat related to this axial force applied by the actuation mechanism. At one point, enough friction is generated between the sheave walls and the drivebelt to produce a significant force transfer between the driveshaft and the drivebelt, thereby causing torque from the motor to be transferred as a driving force on the drivebelt. This driving force is transferred to the driven pulley of the CVT. Other models of driving pulleys can comprise a clutching function involving two or more contact surfaces.

The operation of the CVT as described above can be somewhat divided in three modes of operation. The first mode of operation is the unclutched mode of operation, where the driveshaft can rotate but no torque is transmitted to the drivebelt. The second mode is the fully clutched mode of operation, where there is a torque-transmitting engagement between the driveshaft and the drivebelt. The third mode of operation is the clutching (transitional) mode of operation when the driving pulley is between the two other modes.

The clutching mode of operation generally produces a slippage, for instance between two components such as the sides of the drivebelt and the sheave walls, or between the contact surfaces. It is often desirable to minimize such slippage, for instance to reduce wear and to improve the reaction time of the CVT. However, moving the components too quickly can result in undesirably sudden accelerations and noise, for instance. Mitigating the axial impact during the clutching mode is one of the challenges engineers face in the design of driving pulleys. Room for improvements always exists in this area.

SUMMARY

In one aspect, there is provided a driving pulley for a continuously variable transmission, the driving pulley having a fully clutched mode of operation where a drivebelt and a driveshaft are coupled together in a torque transmitting engagement and having an unclutched mode of operation where there is substantially no torque transmitting engagement between the drivebelt and the driveshaft, the driving pulley being rotatable about a rotation axis and comprising: a first and a second sheave coaxially disposed with reference to the rotation axis, the sheaves having mutually-facing conical walls defining a drivebelt-receiving groove, the drivebelt-receiving groove having a variable width depending on a relative axial distance between the first and the second sheave; and at least one transitional clutch spring being in a first position when the driving pulley is in the unclutched mode of operation and being in a second position when the driving pulley is in the fully clutched mode of operation, the at least one transitional clutch spring remaining substantially in its second position regardless of the relative axial distance between the sheaves when the driving pulley is in the fully clutched mode of operation.

In another aspect of the proposed concept, there is provided method of operating a driving pulley in a continuously variable transmission, the driving pulley being operatively mounted to a driveshaft and receiving a drivebelt between opposite sheaves, the method comprising: bringing the driving pulley from an unclutched mode of operation towards a fully clutched mode of operation, the drivebelt being substantially out of a torque transmitting engagement with the driveshaft in the unclutched mode of operation and being in a torque transmitting engagement with the driveshaft in the fully clutched mode of operation; mitigating an axial impact in the driving pulley by compressing at least one clutch spring during a transition from the unclutched mode of operation to the fully clutched mode of operation; and operating the driving pulley in the fully clutched mode of operation while the at least one clutch spring remains substantially in a same compression state.

Further details of these and other aspects of the proposed concept will be apparent from the detailed description and the appended figures.

BRIEF DESCRIPTION OF THE FIGURES

FIG. 14 is a longitudinal cross-sectional view illustrating an actual example of a driving pulley incorporating the proposed concept, the driving pulley being shown in an unclutched mode of operation on its upper half and in a fully clutched mode of operation on its bottom half; and FIGS. 15 and 16 are enlarged views of details taken from FIG. 14.

DETAILED DESCRIPTION

Figure 1:
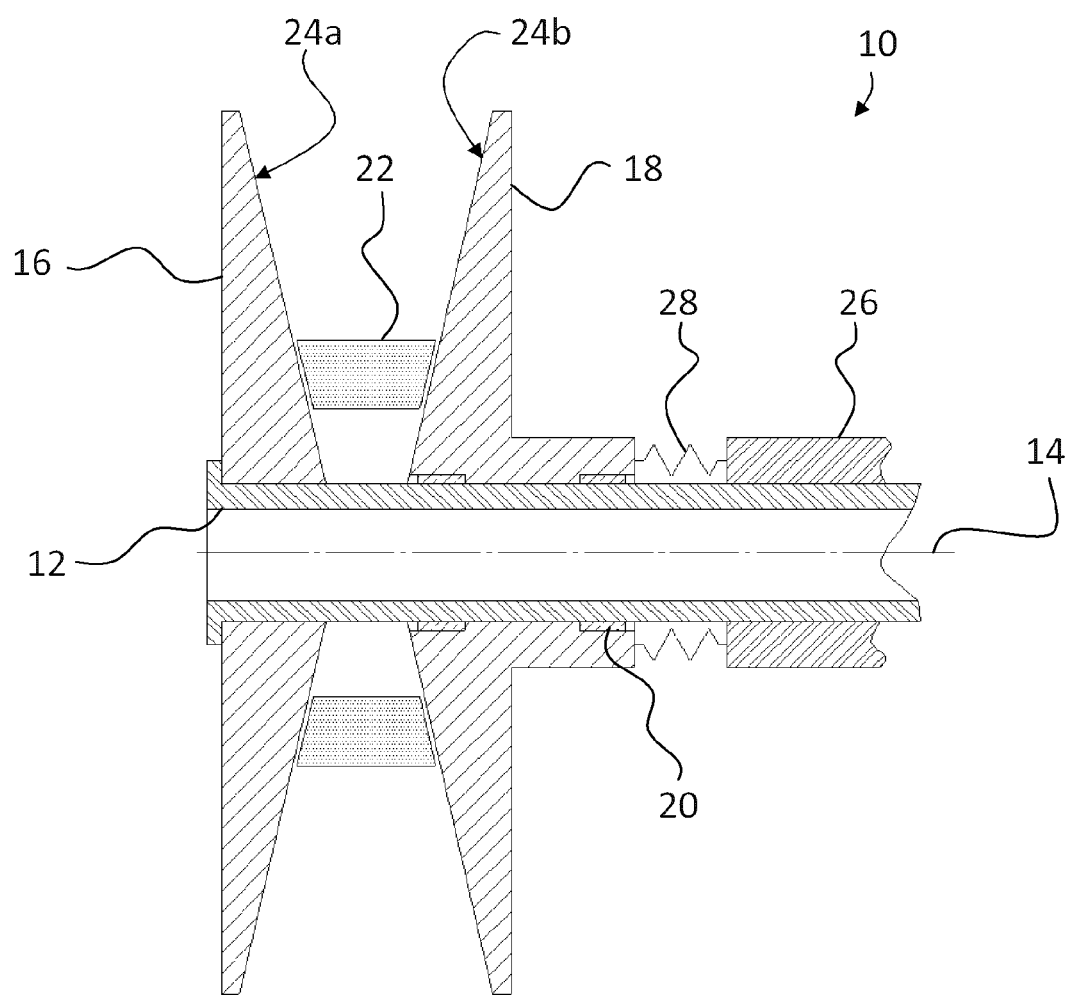
FIG. 1 is a semi-schematic longitudinal cross-sectional view illustrating an example of a driving pulley incorporating the proposed concept, the driving pulley being shown in an unclutched mode of operation.

Throughout the figures, analogous components in the various examples are identified by the same reference numerals.

FIG. 1 is a semi-schematic longitudinal cross-sectional view illustrating an example of a driving pulley 10 of a CVT incorporating the proposed concept. The driving pulley 10 is mounted around a driveshaft 12 configured and disposed for rotation around a central rotation axis 14. The driving pulley 10 comprises a first sheave 16 and a second sheave 18, both sheaves 16, 18 being coaxially disposed with reference to a rotation axis of the driving pulley 10. In the illustrated example, the rotation axis of the driving pulley 10 is coincident with the central rotation axis 14.

Also in the illustrated example, the first sheave 16 is rigidly connected to the driveshaft 12. The second sheave 18 is configured for movement in an axial direction with reference to the first sheave 16 but is always in a torque transmitting engagement with the driveshaft 12. The second sheave 18 is operatively mounted on the driveshaft 12. Bushings 20 are provided to reduce the friction between the inner portion of the second sheave 18 and the outer surface of the driveshaft 12 during the axial movement. Other arrangements are possible as well.

The sheaves 16, 18 have opposite substantially conical walls 24a, 24b between which one end of a trapezoidal drivebelt 22 is provided. FIG. 1 illustrates the drivebelt 22 in an unclutched mode of operation between the sheave walls 24a, 24b. The second sheave 18 is distant enough from the first sheave 16 to leave the drivebelt 22 out of engagement with the sheave walls 24a, 24b. This can correspond to the position of the driving pulley 10 when the motor is at idle rotational speed or close to such speed, for instance.

The axial position of the second sheave 18 in the illustrated example is controlled by an actuation mechanism. FIG. 1 schematically illustrates a side of a generic actuation mechanism 26. The actuation mechanism 26 sets the position of the second sheave 18 with reference to the first sheave 16 and this changes the winding diameter of the drivebelt 22 on the driving pulley 10. The actuation mechanism 26 can be powered and controlled using different kinds of arrangements or devices. These arrangements or devices can be for instance mechanical, electrical, hydraulic, etc. The mechanism can also include two or more types of actuation mechanisms and/or be controlled using a computer or the like. A person skilled in the art will know how to construct such actuation mechanism and therefore, the actuation mechanism needs not be further discussed herein.

FIG. 1 schematically illustrates that the driving pulley 10 includes a transitional clutch spring 28. In the illustrated example, the clutch spring 28 is provided between the second sheave 18 and the side of the actuation mechanism 26. The clutch spring 28 is schematically illustrated in FIG. 1. The clutch spring 28 is designed to absorb the axial impact in the driving pulley 10 during a transition from the unclutched mode of operation to the fully clutched mode of operation.

Figure 2:
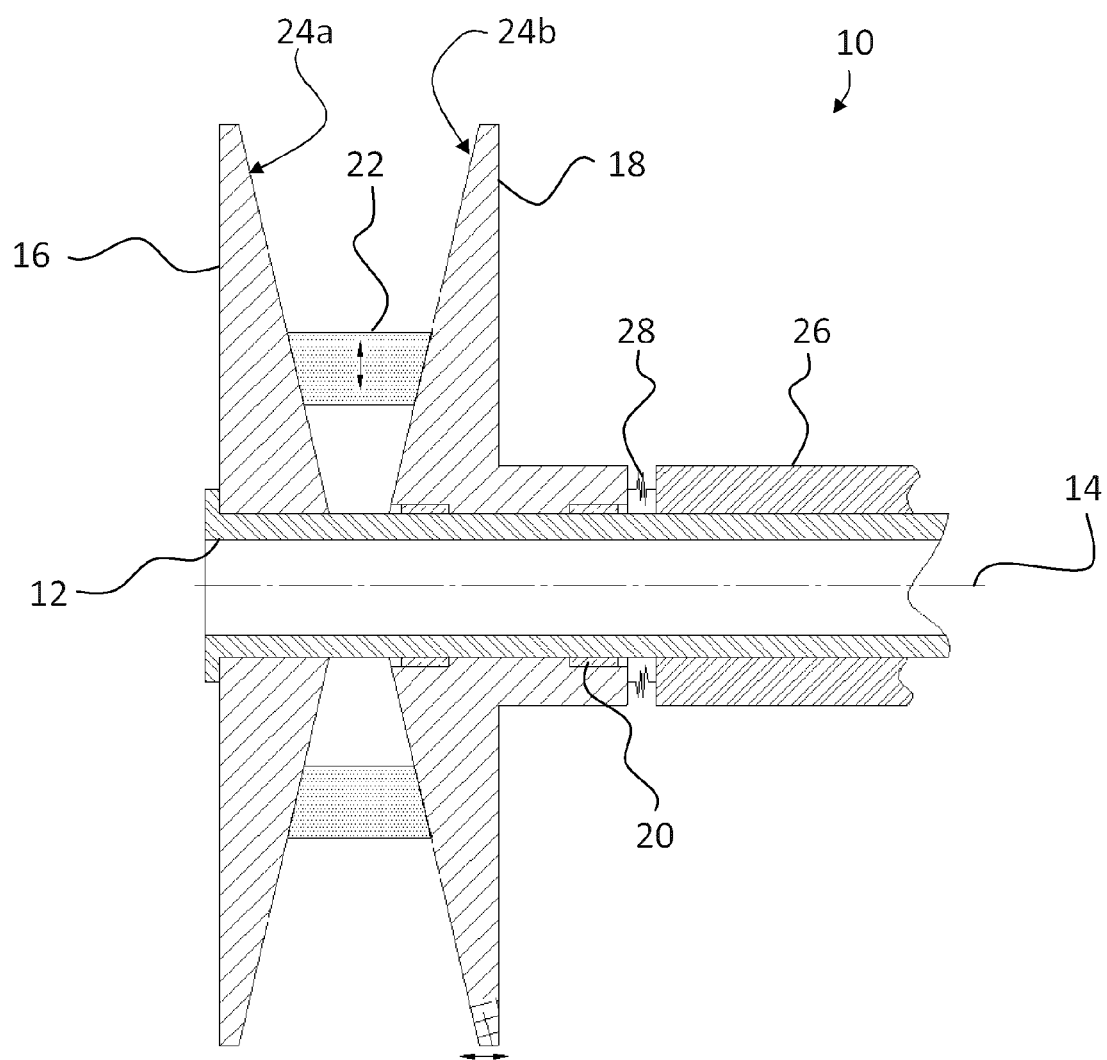
FIG. 2 illustrates the driving pulley of FIG. 1 in a fully clutched mode of operation and at a low ratio.

FIG. 2 illustrates the driving pulley 10 of FIG. 1 in a fully clutched mode of operation and at a low ratio of the CVT. During the transition from the position shown in FIG. 1 and that shown in FIG. 2, the side of the actuation mechanism 26 moved to the left in the figures, causing the clutch spring 28 to be compressed. The clutch spring 28 then transmitted the axial force to the back of the second sheave 18. The transmitted axial force, however, was transmitted progressively—i.e. following the spring constant of the clutch spring 28.

FIG. 2 further illustrates that the clutch spring 28 can be designed to be fully compressed once the sheave walls 24a, 24b and the drivebelt 22 of the illustrated example are in a fully clutched mode of operation. The actuation mechanism 26 can then operate as if the clutch spring 28 is not present.

Figure 3:
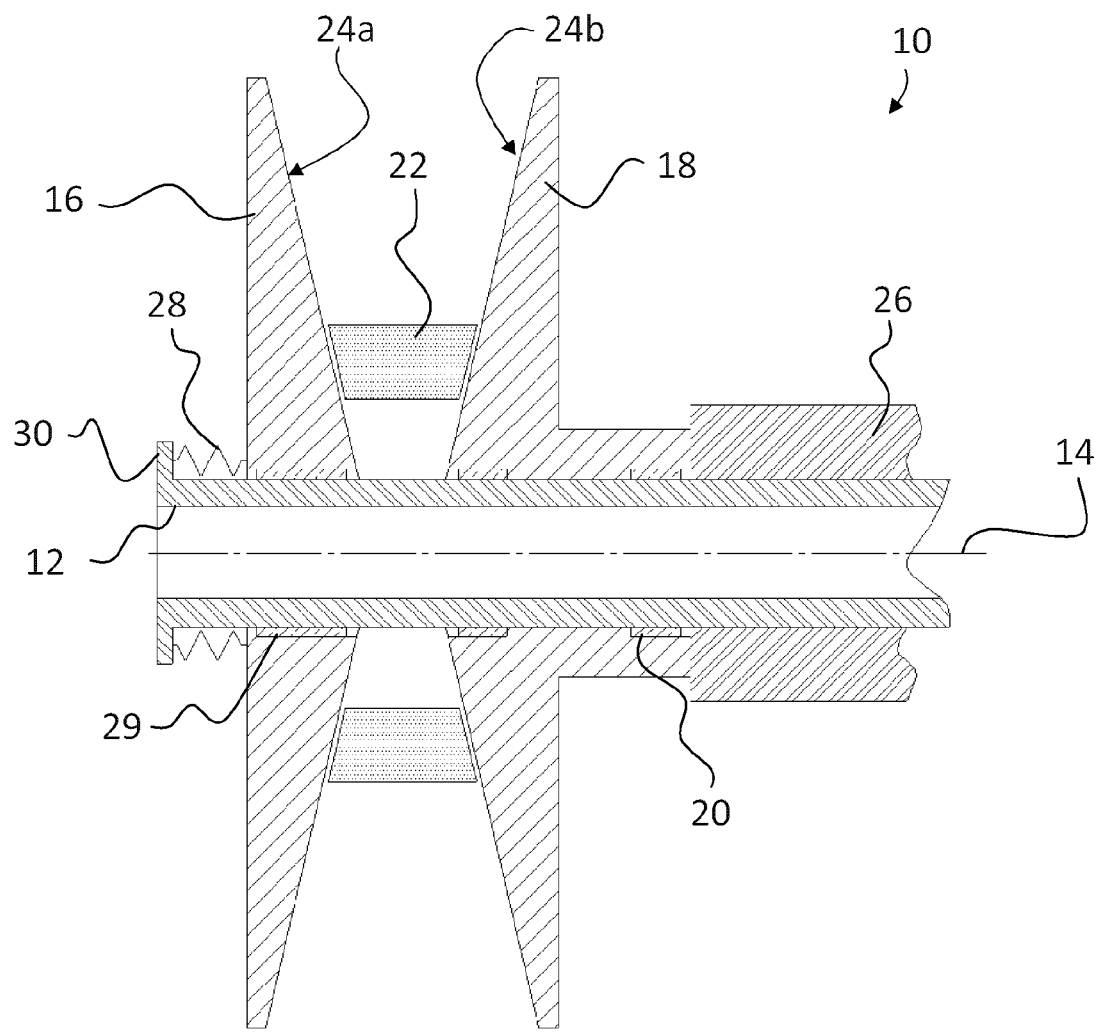
FIG. 3 is a semi-schematic longitudinal cross-sectional view illustrating another example of a driving pulley incorporating the proposed concept, the driving pulley being shown in an unclutched mode of operation.
Figure 4:
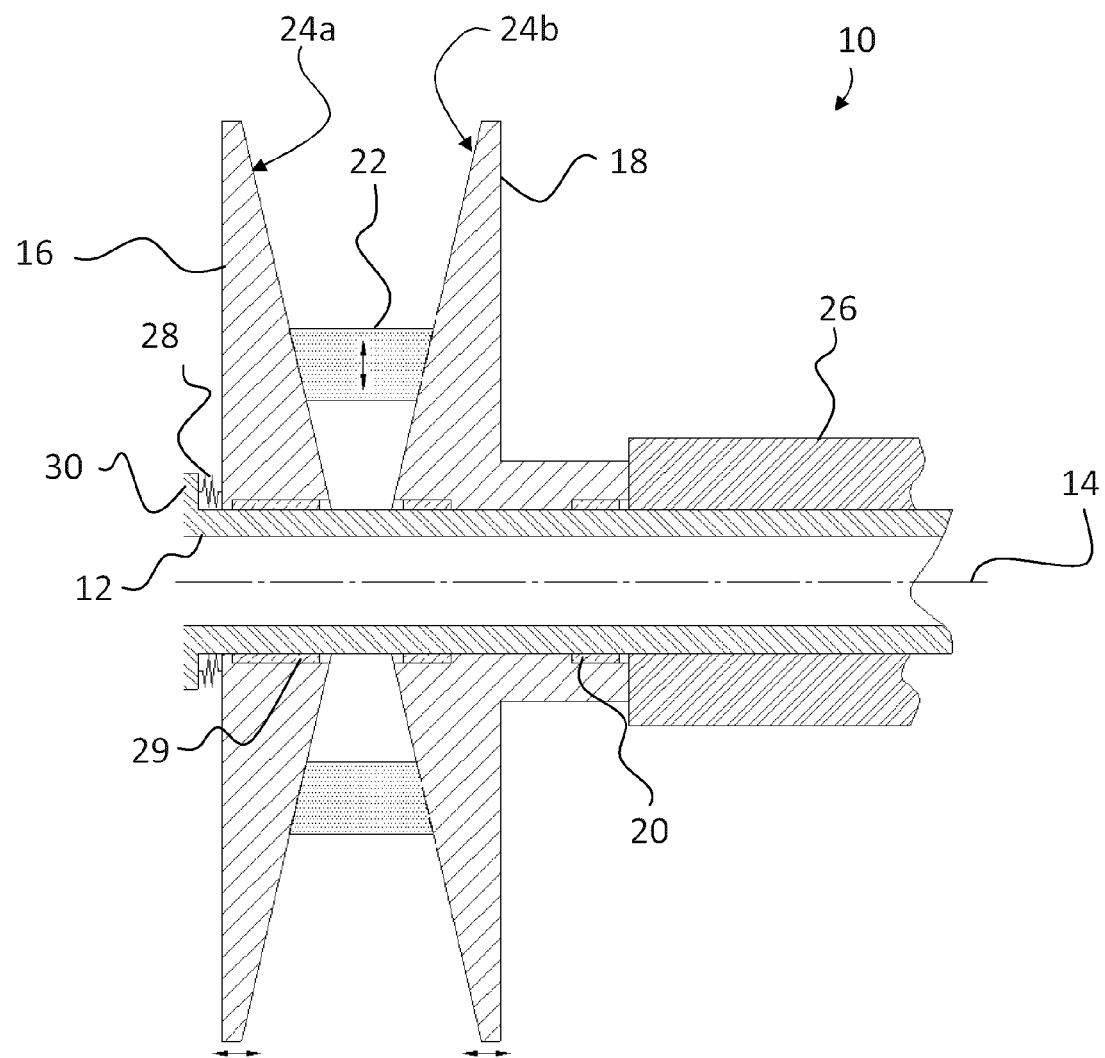
FIG. 4 illustrates the driving pulley of FIG. 3 in a fully clutched mode of operation and at a low ratio.

FIGS. 3 and 4 illustrate another example of a driving pulley 10 incorporating the proposed concept. FIG. 3 is a semi-schematic longitudinal cross-sectional view of the unclutched driving pulley 10. FIG. 4 illustrates the CVT driving pulley 10 of FIG. 3 in a fully clutched mode of operation and at a low ratio of the CVT. The example of FIGS. 3 and 4 differs from the example of FIGS. 1 and 2 in that the clutch spring 28 is provided between the first sheave 16 and a stop 30 at the end of the driveshaft 12. The first sheave 16 of FIGS. 3 and 4 is axially movable with reference to the driveshaft 12 over a limited distance using a suitable sliding arrangement, for instance a bushing 29. The clutch spring 28 becomes fully compressed once the driving pulley 10 is in a fully clutched mode of operation, as shown in FIG. 4.

Figure 5:
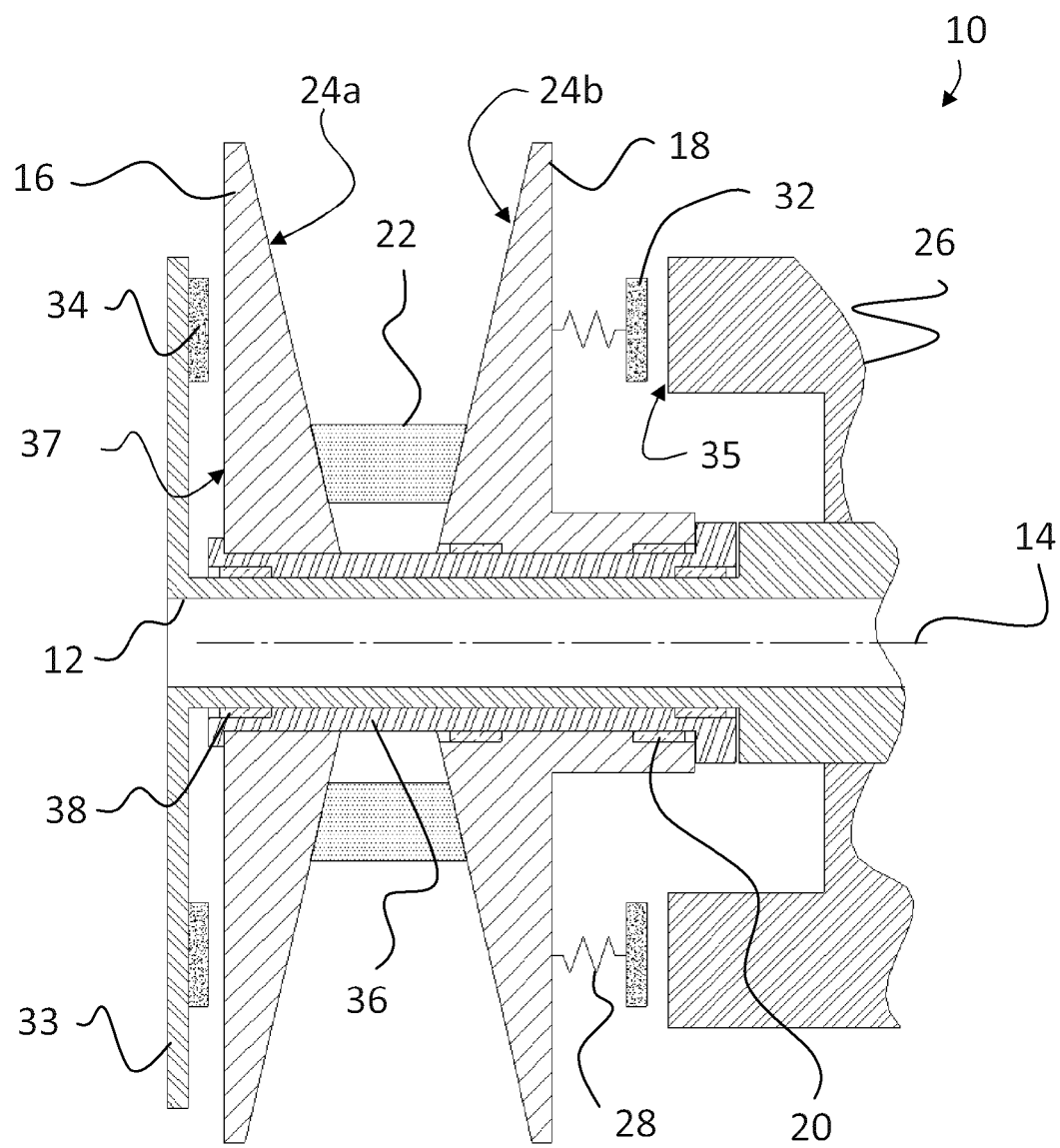
FIG. 5 is a semi-schematic longitudinal cross-sectional view illustrating another example of a driving pulley incorporating the proposed concept, the driving pulley being shown in an unclutched mode of operation.
Figure 6:
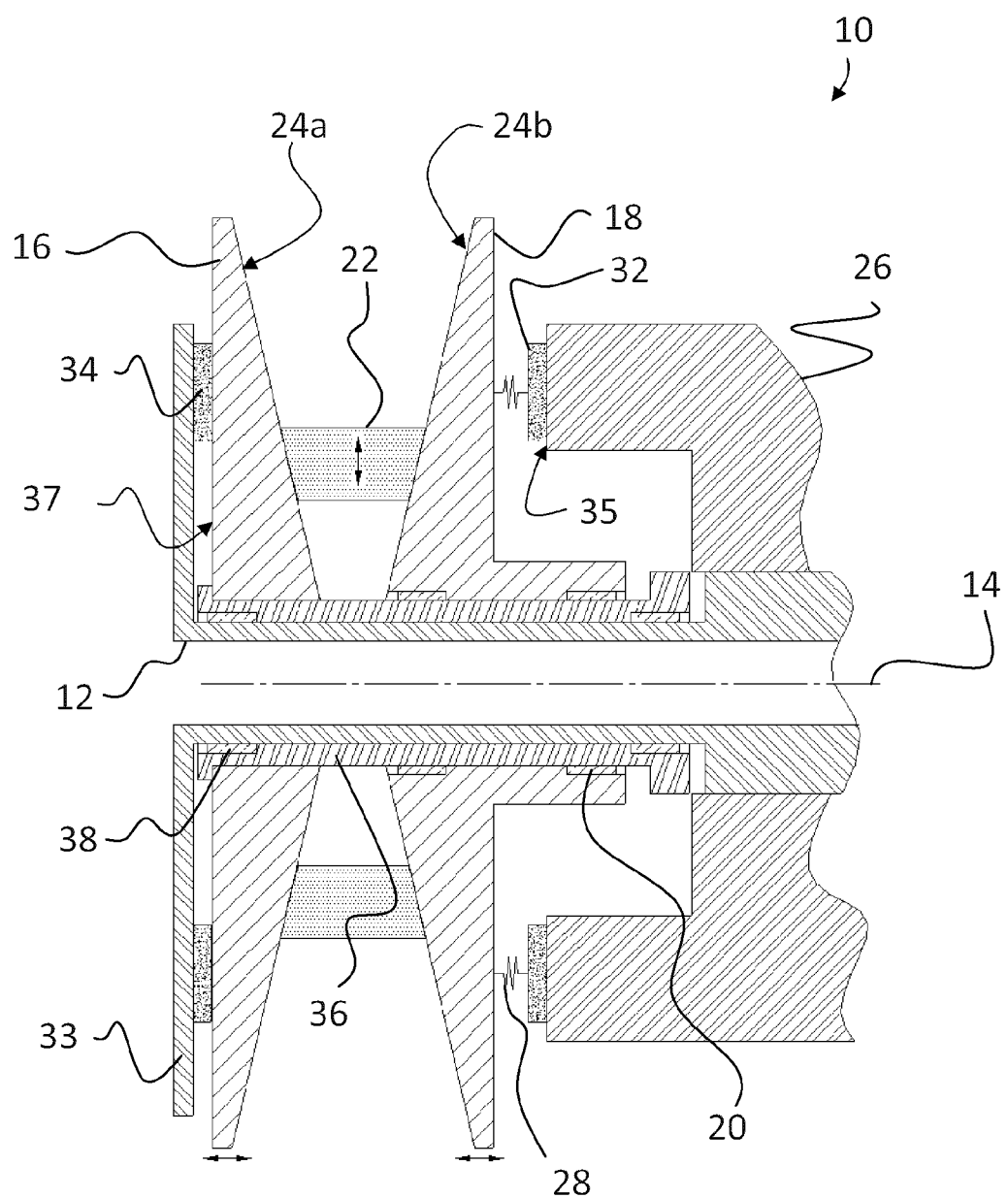
FIG. 6 illustrates the driving pulley of FIG. 5 in a fully clutched mode of operation and at a low ratio.

FIGS. 5 and 6 illustrate another example of a driving pulley 10 incorporating the proposed concept. FIG. 5 is a semi-schematic longitudinal cross-sectional view of the unclutched driving pulley 10. FIG. 6 illustrates the driving pulley 10 of FIG. 5 in a fully clutched mode of operation and at a low ratio of the CVT. The example of FIGS. 5 and 6 differs from the examples of FIGS. 1 to 4 in that the drivebelt 22 is always in engagement with the sheave walls 24a, 24b. The clutching function is provided by an annular friction pad 32 connected to the second sheave 18 by a suitable arrangement (not shown), and by an annular friction pad 34 connected to the driveshaft 12 through a radially-extending flange 33. The friction pads 32, 34 engage corresponding contact surfaces 35, 37 during the transition from the unclutched mode of operation to the fully clutched mode of operation and they remained engaged during the fully clutched mode of operation.

It should be noted that the friction pads 32, 34 can be in the form of a plurality of discrete segments instead or be circumferentially continuous. The clutch spring 28 is provided somewhere between the second sheave 18 and the friction pad 32. Both sheaves 16, 18 are mounted around a hub 36 coaxially disposed around the driveshaft 12. The hub 36 is configured and disposed to be mounted around the driveshaft 12. The illustrated example comprises bushings 38 between the interior of the hub 36 and the exterior of the driveshaft 12. The driveshaft 12 becomes in a torque-transmitting engagement with the drivebelt 22 when the friction pads 32, 34 are in a friction engagement with their respective contact surfaces 35, 37, as shown for instance in FIG. 6.

Figure 7:
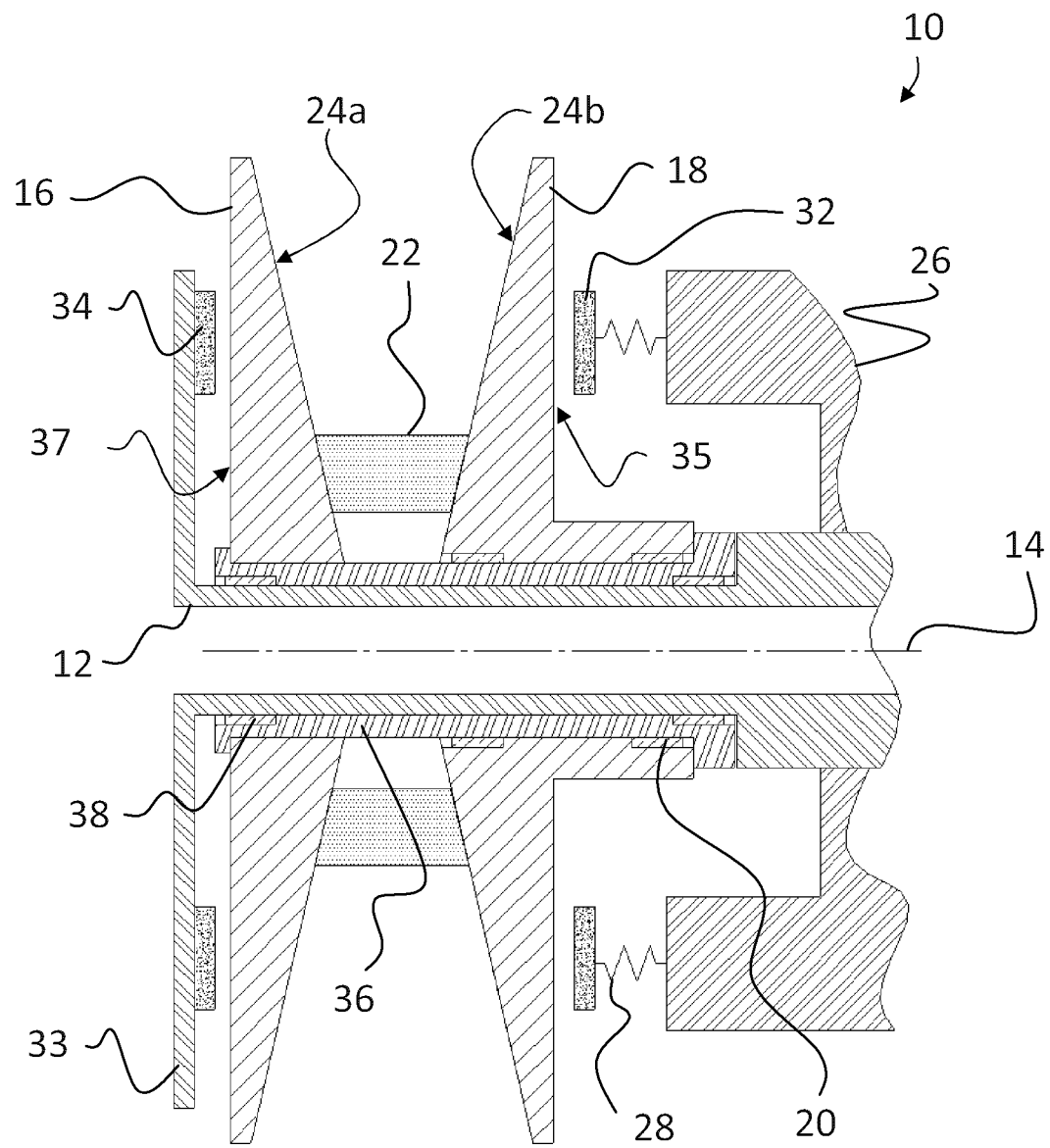
FIG. 7 is a semi-schematic longitudinal cross-sectional view illustrating another example of a driving pulley incorporating the proposed concept, the driving pulley being shown in an unclutched mode of operation.
Figure 8:
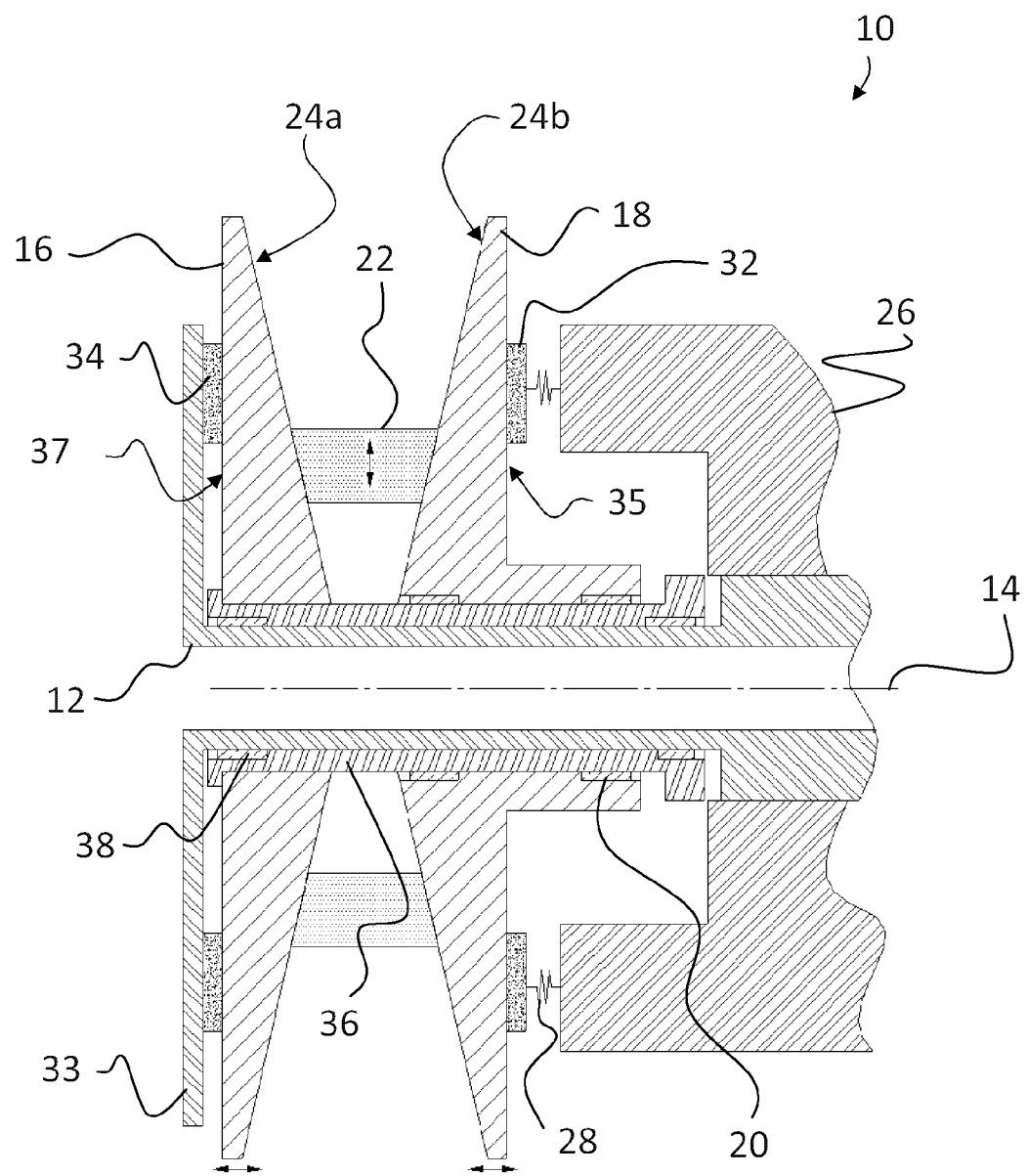
FIG. 8 illustrates the driving pulley of FIG. 7 in a fully clutched mode of operation and at a low ratio.

FIGS. 7 and 8 illustrate another example of a driving pulley 10 incorporating the proposed concept. FIG. 7 is a semi-schematic longitudinal cross-sectional view of the unclutched driving pulley 10. FIG. 8 illustrates the driving pulley 10 of FIG. 7 in a fully clutched mode of operation and at a low ratio of the CVT. The example of FIGS. 7 and 8 differs from the example of FIGS. 5 to 6 in that the friction pad 32 is connected to the side of the actuation mechanism 26, and in that the clutch spring 28 is provided between the friction pad 32 and the side of the actuation mechanism 26.

Figure 9:
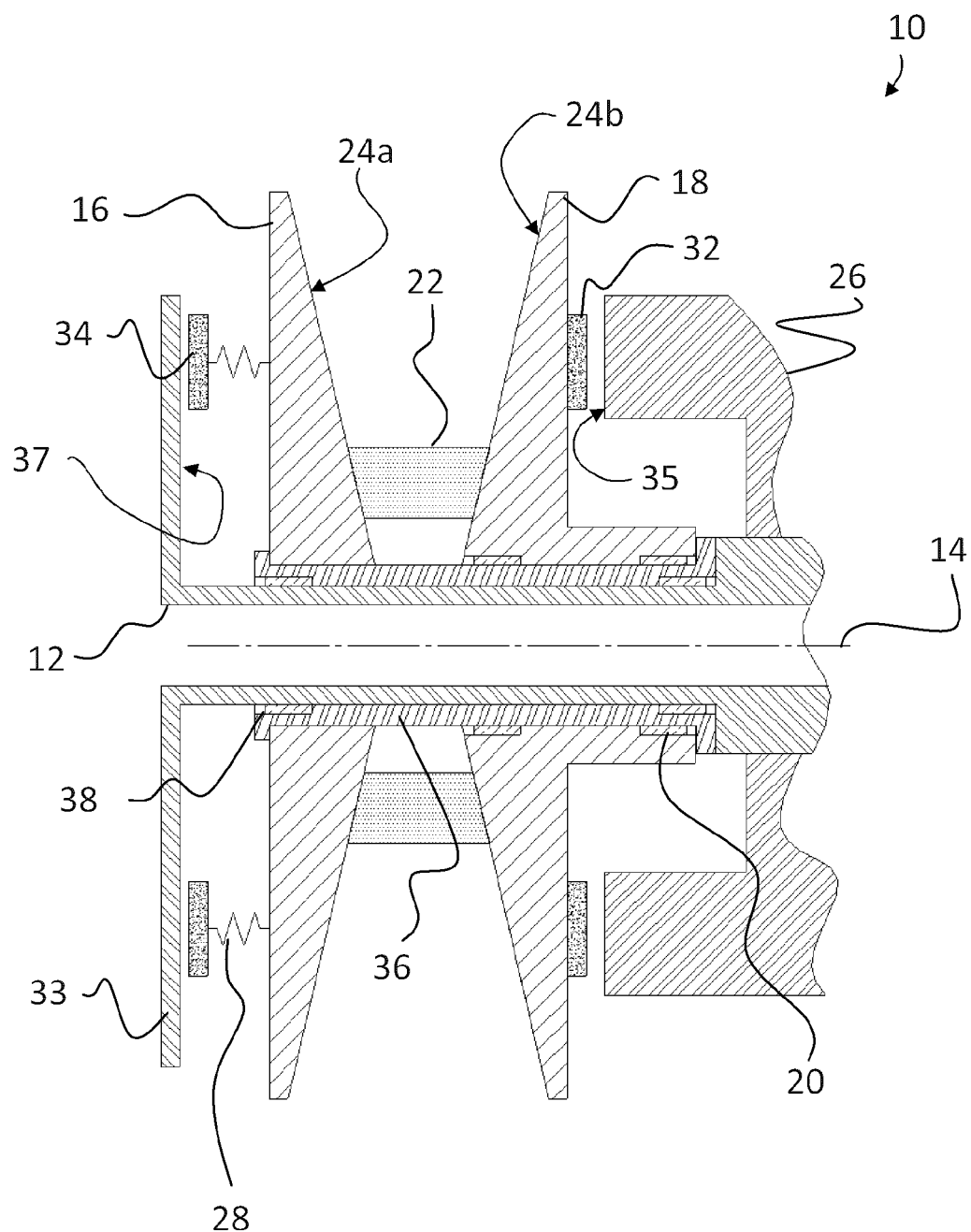
FIG. 9 is a semi-schematic longitudinal cross-sectional view illustrating another example of a driving pulley incorporating the proposed concept, the driving pulley being shown in an unclutched mode of operation.
Figure 10:
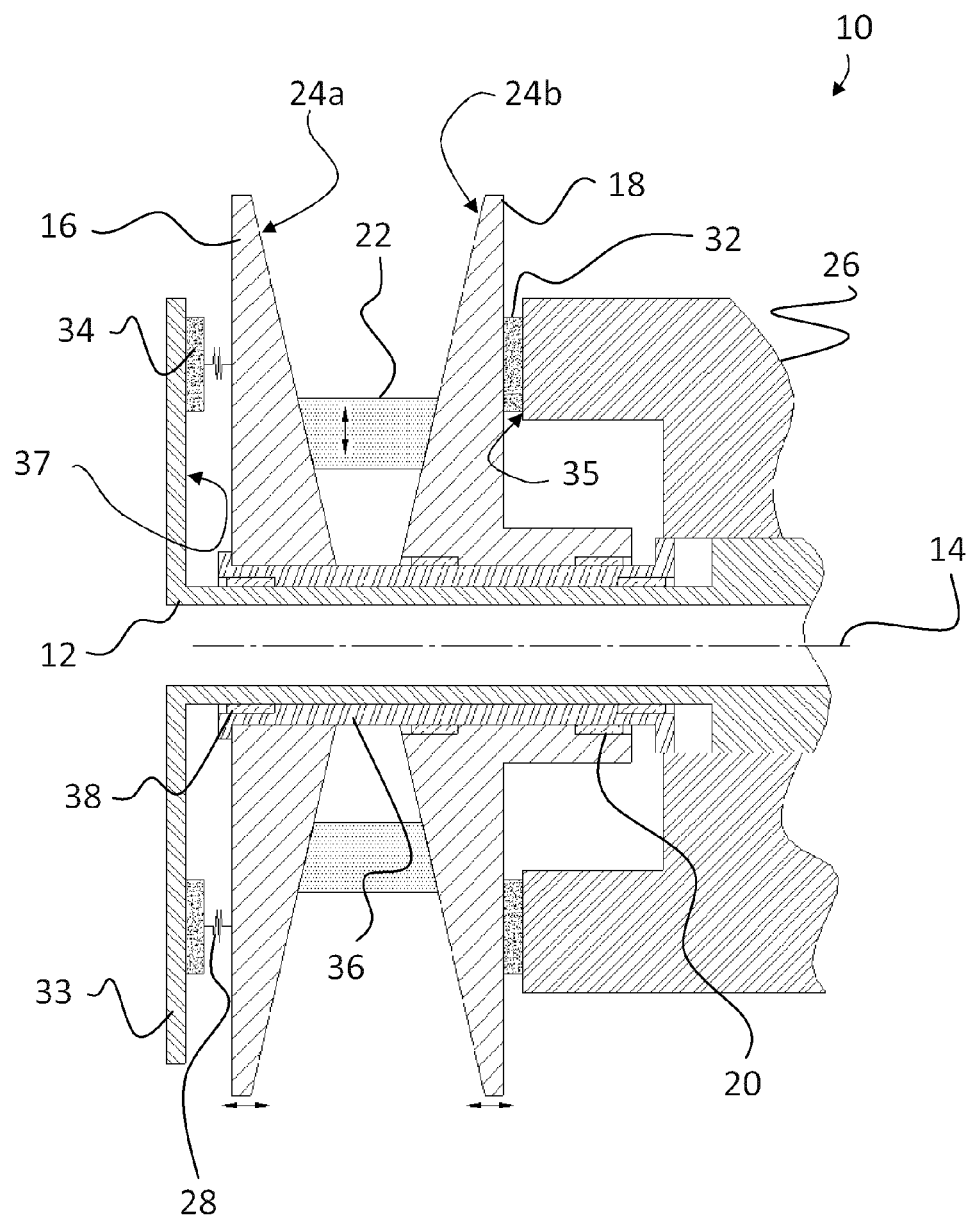
FIG. 10 illustrates the driving pulley of FIG. 9 in a fully clutched mode of operation and at a low ratio.

FIGS. 9 and 10 illustrate another example of a driving pulley 10 incorporating the proposed concept. FIG. 9 is a semi-schematic longitudinal cross-sectional view of the unclutched driving pulley 10. FIG. 10 illustrates the driving pulley 10 of FIG. 9 in a fully clutched mode of operation and at a low ratio of the CVT. The example of FIGS. 9 and 10 differs from the examples of FIGS. 5 to 8 in that the clutch spring 28 is provided between the friction pad 34 and the first sheave 16. The contact surface 37 is on the radially-extending flange 33.

Figure 11:
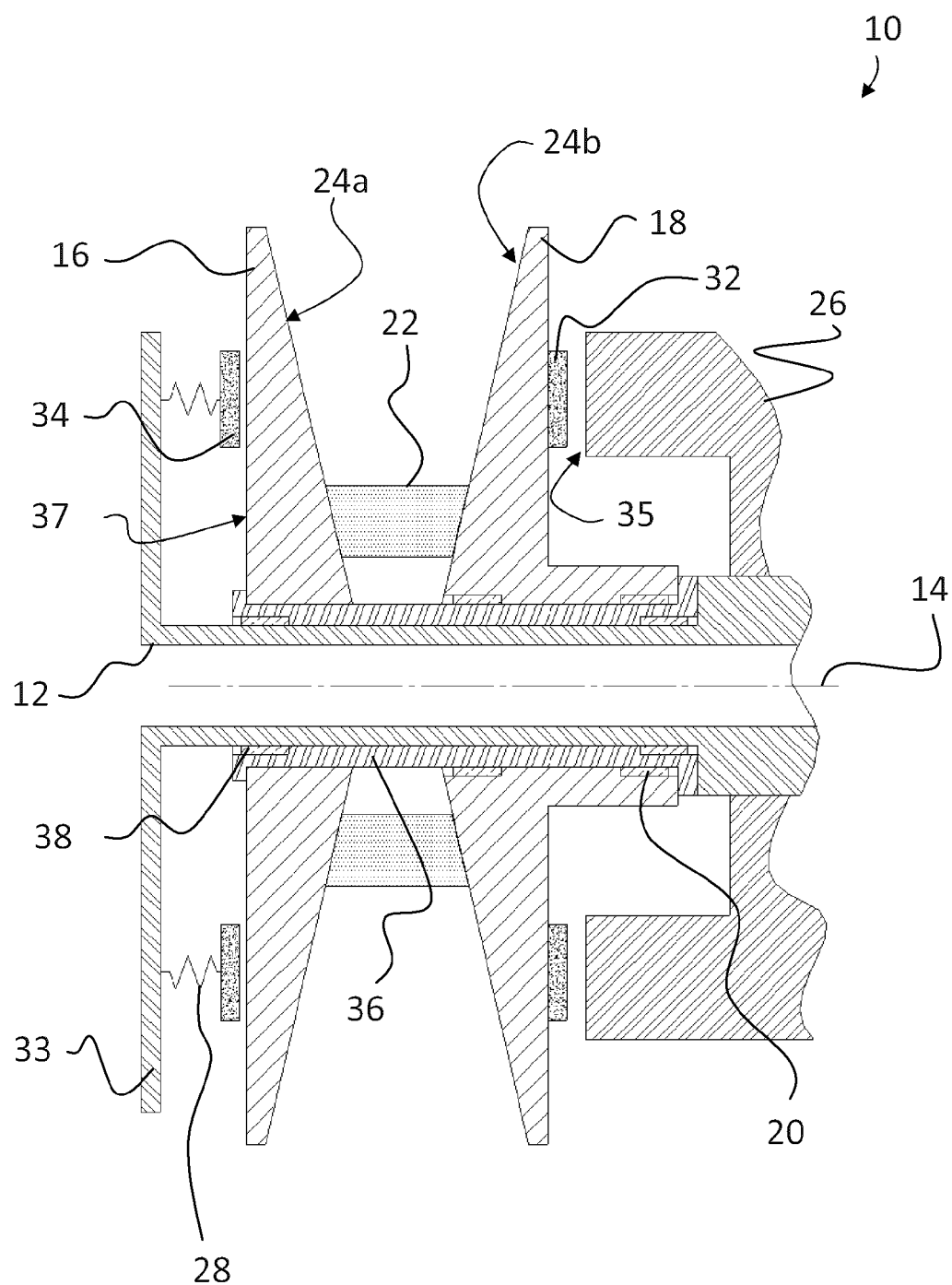
FIG. 11 is a semi-schematic longitudinal cross-sectional view illustrating another example of a driving pulley incorporating the proposed concept, the driving pulley being shown in an unclutched mode of operation.
Figure 12:
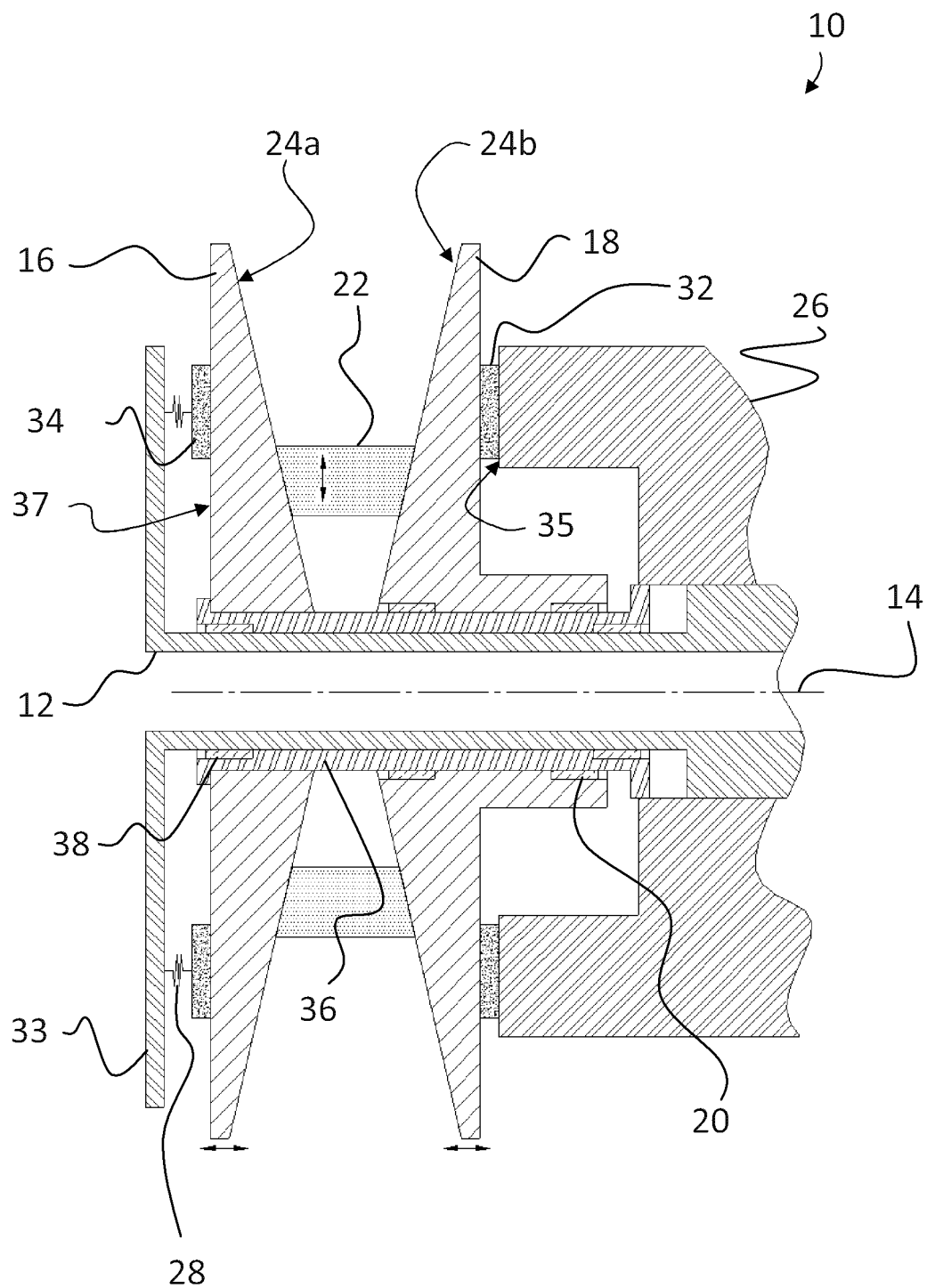
FIG. 12 illustrates the driving pulley of FIG. 11 in a fully clutched mode of operation and at a low ratio.

FIGS. 11 and 12 illustrate another example of a driving pulley 10 incorporating the proposed concept. FIG. 11 is a semi-schematic longitudinal cross-sectional view of the unclutched driving pulley 10. FIG. 12 illustrates the driving pulley 10 of FIG. 11 in a fully clutched mode of operation and at a low ratio of the CVT. The example of FIGS. 11 and 12 differs from the example of FIGS. 9 and 10 in that the clutch spring 28 is provided between the friction pad 34 and the radially-extending flange 33. The contact surface 37 is on the back side of the first sheave 16.

As can be appreciated, operating a driving pulley 10 having at least one clutch spring 28 can provide a smoother transition between the unclutched mode of operation to the fully clutched mode of operation. Furthermore, the clutch spring 28 becomes substantially inactive once the driving pulley 10 is in the fully clutched mode of operation. The clutch spring 28 remains in the same compressed state as long as the axial force between the side of the actuation mechanism 26 and the sheaves 16, 18 is greater than the return force generated by the clutch spring 28.

The clutch spring 28 can be extended again in some instances without going to an unclutched mode of operation after a fully clutched mode of operation. For example, when a vehicle with the CVT is slowing down, the side of the side of the actuation mechanism 26 can move back quickly towards a low ratio position and the clutch spring 28 can provide a smoother transition if the side of the actuation mechanism 26 suddenly re-applies an axial force to move the sheave walls 24a, 24b towards each other before a full stop of the vehicle.

Different kinds of springs can be provided for use as clutch springs, for instance helical springs, washer-type springs, Belleville springs, wave springs, or any suitable device with a sufficiently low stiffness. The rigidly of the clutch spring 28 can be thus proportional or not to the displacement of the side of the actuation mechanism 26 since depending on the kind of springs that is used, the spring constant can be linear, nonlinear or even both.

As can be appreciated, the smaller stiffness of the clutch spring 28 as compared to the axial drivebelt stiffness provides a more precise control of the axial force during the transitional clutching mode of operation.

Figure 13:
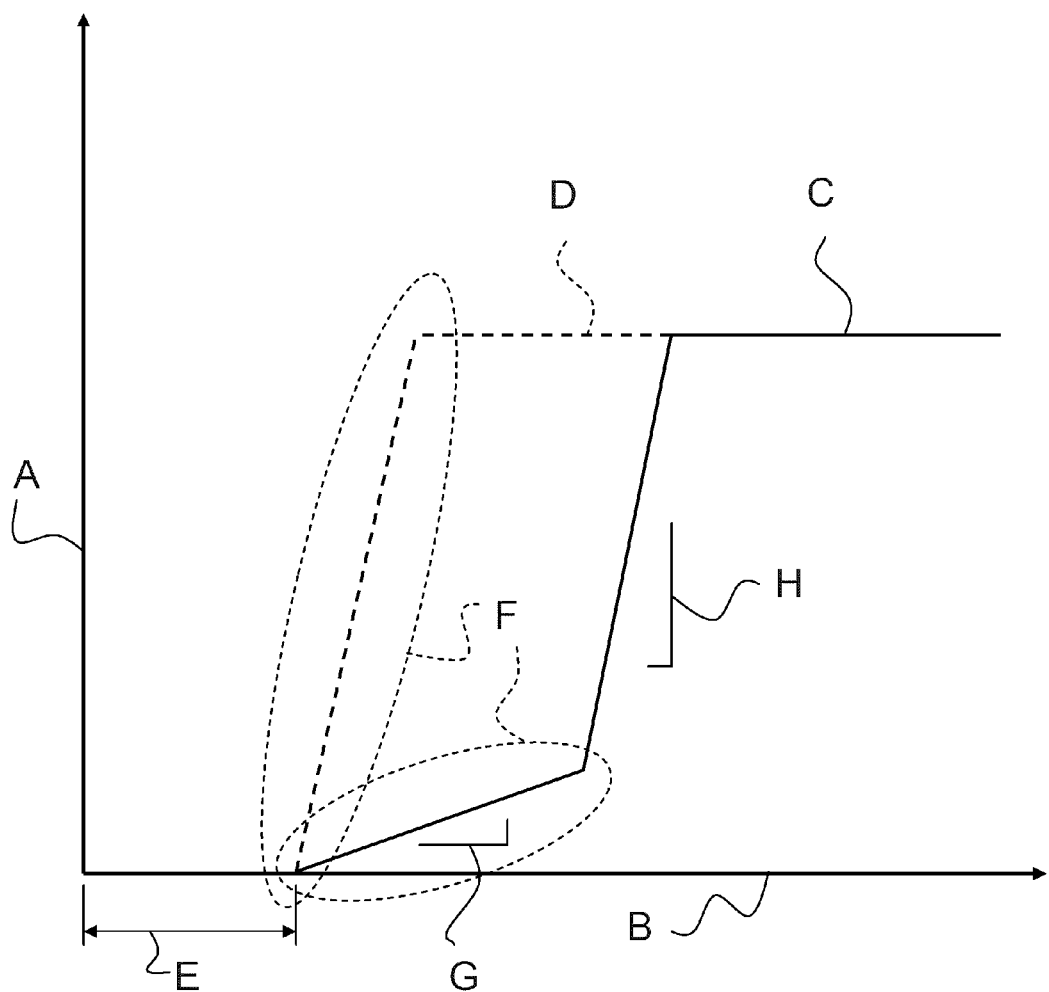
FIG. 13 is a graph illustrating a generic example of the axial force exerted by the actuation mechanism with reference to the displacement of one of its sides.

FIG. 13 is a graph depicting a generic example of the axial force (A) exerted by the actuation mechanism 26 with reference to the actuator displacement (B). The solid line (C) shows that once the contact between the drivebelt 22 and the sheave walls 24a, 24b is initiated, the axial force of the actuation mechanism 26 can be controlled by the clutch spring 28 over a substantial portion of the initial actuator displacement. Once the clutch spring 28 is fully compressed, the drivebelt stiffness controls the axial force but only over a very limited range. The axial force reaches a maximum thereafter.

The stippled line (D) in FIG. 13 depicts an example of the axial force without the clutch spring 28. In that case, only the drivebelt stiffness initially controls the axial force and this occurs over a very limited range. Of course, it should be noted that FIG. 13 is only schematic in nature and the actual graph of axial force with reference to the actuator displacement can be different. For instance, the initial portion of the line in the graph does not necessarily need to be linear since various kinds of clutch springs can yield other behaviors.

In FIG. 13, letter E refers to the drivebelt free play, letter F refers to the axial force during the transition, letter G refers to the clutch spring stiffness and letter H refers to the drivebelt axis stiffness.

If desired, it is possible to provide a stop (not shown) or a similar arrangement to prevent the entire axial force from the actuation mechanism 26 to be transmitted through the clutch spring 28 at one point during the fully clutched mode of operation. The stop can include for instance a set of axially-extending lugs (not shown) attached to the side of the actuation mechanism 26 or to the back of the second sheave 18 (see for example FIGS. 1 and 2), or attached for instance to the back of the first sheave 16 or the stop 30 (see for example FIGS. 3 and 4) to provide a rigid engagement contact before to the fully compressed position of the clutch spring 28. Nevertheless, it is not necessary to completely inactivate the clutch spring 28 by a stop or similar arrangement, or design the clutch spring 28 so that it becomes fully compressed in absence of stops or similar arrangements. For instance, the transition from the clutch spring stiffness region to the drivebelt axial stiffness region (FIG. 13) can be done gradually and the clutch spring 28 can be designed with a stiffness that is high enough near the end of the transition that the maximum axial force required to change the ratio the CVT during the fully clutched mode of operation is less than the force required to compress the clutch spring 28 furthermore.

The proposed concept also provides a method of operating a driving pulley in a continuously variable transmission. The driving pulley can be any one of the driving pulley 10 illustrated in the figures or another model of driving pulley. The driving pulley 10 is operatively mounted to the driveshaft 12 and receives the drivebelt 22 between its opposite sheaves 16, 18. The method comprises bringing the driving pulley 10 from an unclutched mode of operation towards a fully clutched mode of operation. The drivebelt 22 is substantially out of a torque transmitting engagement with the driveshaft 12 in the unclutched mode of operation. However, the drivebelt 22 is in a torque transmitting engagement with the driveshaft 12 in the fully clutched mode of operation. In use, the axial impact during a transition from the unclutched mode of operation to the fully clutched mode of operation in the driving pulley is mitigated by compressing the at least one clutch spring 28. Then, the driving pulley 10 is operated in the fully clutched mode of operation while the at least one clutch spring 28 remains substantially in a same compression state.

FIG. 14 is a longitudinal cross-sectional view illustrating an actual example of a driving pulley 10 incorporating the proposed concept. This example is similar to the one shown semi-schematically in FIGS. 1 and 2. In FIG. 14, the driving pulley 10 is shown in an unclutched mode of operation on its upper half and in a fully clutched mode of operation on its bottom half. FIG. 14 also illustrates that a bearing 40 can be provided between the two sheaves 16, 18 to support the weight of the drivebelt (not shown in FIG. 14) when the driving pulley 10 is in the unclutched mode of operation. The interior of the bearing 40 is mounted over the driveshaft 12. The sheave 16 is rigidly connected to the driveshaft 12 while the other sheave 18 is in a sliding engagement with the driveshaft 12. The sheaves 16, 18 rotate with the driveshaft 12.

The actuation mechanism 26 in FIG. 14 is not rotating with the driveshaft 12 and with the sheaves 16, 18. Thus, the actuation mechanism 26 is mounted around the driveshaft 12 using two bearings 42, 44. The actuation mechanism 26 includes a first rotatable threaded member 46 that is meshed to a second fixed threaded member 48. A motor and an associated linkage (not shown) are provided in the actuation mechanism 26 to rotate the first member 46 with reference to the second member 48, thereby axially moving the side of the first member 46 with reference to the driveshaft 12.

Initially, the driving pulley 10 is in an unclutched mode of operation as shown in the upper half of FIG. 14. As best shown in the enlarged view (FIG. 15), the left side of the first member 46 does not engage the side of the outer race of the bearing 42. An annular clutch spring 28 occupies some of the axial space 50 between the side of the first member 46 and the bearing 42.

When the driving pulley 10 is in a fully clutched mode of operation, as shown in the bottom half of FIG. 14 and in the enlarged view of FIG. 16, the left side of the first member 46 applies a force on the side of the outer race of the bearing 42. The clutched spring 28 is then fully compressed.

It should be noted that in the example illustrated in FIG. 14, there is a small relative axial sliding movement between the outer race of the bearing 42 and the first member 46 during the clutching mode of operation.

The above description is meant to be exemplary only, and one skilled in the art will recognize that changes can be made while still remaining in the same concept. For example, the driving pulley can be mounted on a shaft that is designed to be itself mounted or be otherwise mechanically connected to the driveshaft of a vehicle or another apparatus incorporating a CVT. The word "motor" is used in a generic sense and includes any kind of devices providing a torque, including, for instance, electric motors, hydraulic motors, internal combustion engines, etc. The CVT in which a driving pulley incorporating the proposed concept is provided can be a reversible one. It is be possible to provide the actuation mechanism on the same side as the first sheave and actuate the position of the second sheave through a linking member, for instance a shaft coaxially mounted around the driveshaft. More than on clutch spring can be provided in a same driving pulley, if desired. For instance, one can design a driving pulley incorporating both the clutch spring of FIGS. 1 and 2 and the clutch spring of FIGS. 3 and 4. Still, many other variants are possible.

What is claimed is:

1. A driving pulley for a continuously variable transmission, the driving pulley having a fully clutched mode of operation where a drivebelt and a driveshaft are coupled together in a torque transmitting engagement and having an unclutched mode of operation where there is substantially no torque transmitting engagement between the drivebelt and the driveshaft, the driving pulley being rotatable about a rotation axis and comprising:

a first and a second sheave coaxially disposed with reference to the rotation axis, the sheaves having mutually-facing conical walls defining a drivebelt-receiving groove, the drivebelt-receiving groove having a variable width depending on a relative axial distance between the first and the second sheave;

an actuation mechanism having one side axially movable within a range of axial positions, the relative axial distance between the two sheaves being selected by moving the side of the actuation mechanism within at least a portion of its axial position range and the driving pulley being set in one among the fully clutched mode of operation and the unclutched mode of operation depending on the axial position of the side of the actuation mechanism; and at least one transitional clutch spring being in a first position when the driving pulley is in the unclutched mode of operation and being in a second position when the driving pulley is in the fully clutched mode of operation, the at least one transitional clutch spring remaining in its second position and substantially in a same compression state regardless of the relative axial distance between the sheaves when the driving pulley is in the fully clutched mode of operation; and wherein when the at least one transitional clutch spring is in the same compression state, the distance between the side of the actuation mechanism and the second sheave remains substantially the same and the actuation mechanism is what moves the second sheave relative to the first sheave.

2. The driving pulley as defined in claim 1, characterized in that the at least one transitional clutch spring generates a greater axial return force at its second position than that at its first position.

3. The driving pulley as defined in claim 1, characterized in that a selection between the fully clutched mode of operation and the unclutched mode of operation of the driving pulley is provided by a friction engagement between at least two components, at least one of these components being a component of the driving pulley.

4. The driving pulley as defined in claim 3, characterized in that the components providing the friction engagement include the conical walls of the sheaves, the distance between the sheaves being wider than a drivebelt width when the driving pulley is in the unclutched mode of operation.

5. The driving pulley as defined in claim 3, characterized in that the components providing the friction engagement include at least two selectively-engagable contact surfaces, at least one of these surfaces being on a back side of one of the sheaves and at least another one of the contact surfaces being rigidly connected to the driveshaft, the contact surfaces being axially movable relative to another one of the contact surfaces.

6. The driving pulley as defined in claim 5, characterized in that the first and the second sheaves are mounted on a hub, the hub having an inner portion configured and disposed to receive the driveshaft therein.

7. The driving pulley as defined in claim 6, characterized in that the components providing the friction engagement include four contact surfaces, one being provided on the back side of the first sheave and forming a first pair of contact surfaces with a corresponding one of the other contact surfaces, another one of the contact surfaces being provided on the back side of the second sheave and forming a second pair of contact surfaces with a corresponding one of the other contact surfaces.

8. The driving pulley as defined in claim 7, characterized in that at least one of the contact surfaces of each pair comprises a friction pad.

9. The driving pulley as defined in claim 8, characterized in that the at least one transitional clutch spring has one side connected to the friction pad.

10. The driving pulley as defined in claim 1, characterized in that the at least one transitional clutch spring includes at least one annular spring.

11. The driving pulley as defined in claim 10, characterized in that the at least one annular spring is fully compressed when the driving pulley is in a fully clutched mode of operation.

12. A method of operating a driving pulley in a continuously variable transmission, the driving pulley being operatively mounted to a driveshaft and receiving a drivebelt between opposite first and second sheaves that are coaxially disposed with reference to a rotation axis, the sheaves having mutually-facing conical walls defining a drivebelt-receiving groove, the drivebelt-receiving groove having a variable width depending on a relative axial distance between the first and the second sheave, the method comprising: bringing the driving pulley from an unclutched mode of operation towards a fully clutched mode of operation using an actuation mechanism having one side axially movable within a range of axial positions, the relative axial distance between the two sheaves being selected by moving the side of the actuation mechanism within at least a portion of its axial position range and the driving pulley being set in one among the fully clutched mode of operation and the unclutched mode of operation depending on the axial position of the side of the actuation mechanism, the drivebelt being substantially out of a torque transmitting engagement with the driveshaft in the unclutched mode of operation and being in a torque transmitting engagement with the driveshaft in the fully clutched mode of operation; mitigating an axial impact during a transition from the unclutched mode of operation to the fully clutched mode of operation by compressing at least one clutch spring in the driving pulley; and operating the driving pulley in the fully clutched mode of operation while the at least one clutch spring remains substantially in a same compression state; wherein when the at least one transitional clutch spring is in the same compression state, the distance between the side of the actuation mechanism and the second sheave remains substantially the same and the actuation mechanism is what moves the second sheave relative to the first sheave.

13. The method as defined in claim 12, characterized in that bringing the driving pulley from the unclutched mode of operation towards the fully clutched mode of operation includes decreasing an axial distance between the sheaves and increasing the friction engagement between the sheaves and the drivebelt.

14. The method as defined in claim 12, characterized in that bringing the driving pulley from the unclutched mode of operation towards the fully clutched mode of operation includes decreasing an axial distance between a plurality of contact surfaces, the decrease of the axial distance increasing the friction engagement between the contact surfaces.

15. The method as defined in claim 14, characterized in that the method includes keeping the sheaves and the drivebelt in a friction engagement during the unclutched mode of operation.

16. The method as defined in claim 12, characterized in that the at least one clutch spring includes an annular spring.

* * * * *